UNITED STATES PATENT OFFICE.

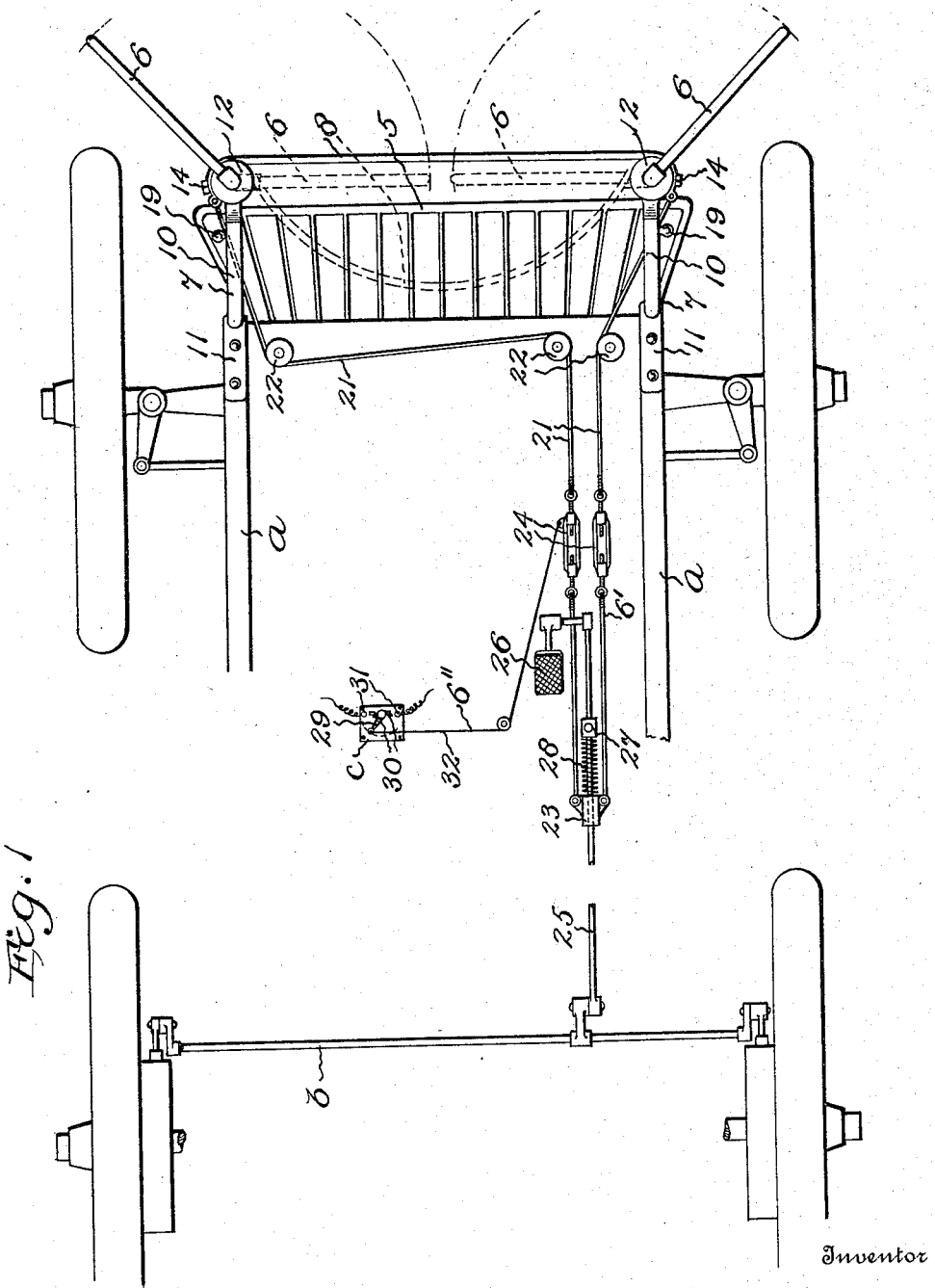

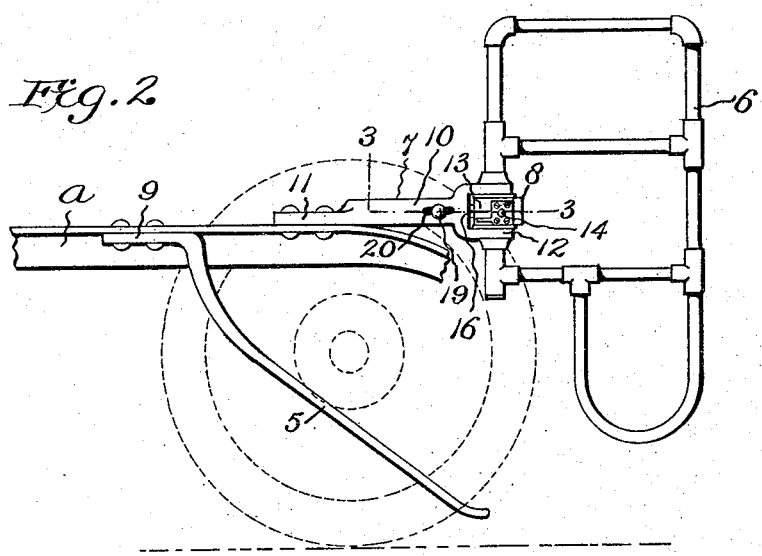
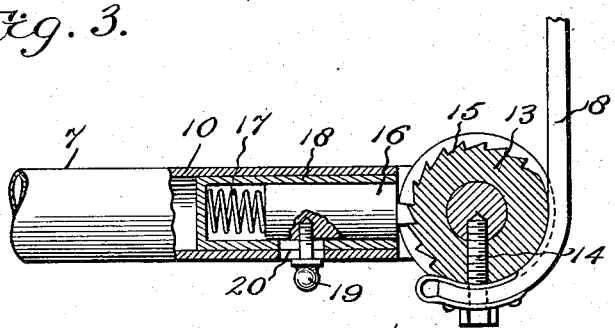
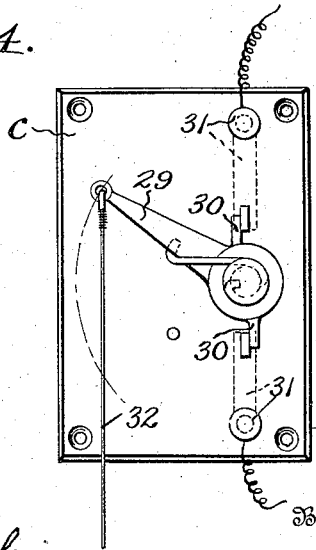

PETER VAN VLAANDEREN, OF BAYONNE, NEW JERSEY.

FENDER.

1,178,429.  Specification of Letters Patent.  Patented Apr. 4, 1916.

Application filed April 3, 1914. Serial No. 829,330.

*To all whom it may concern:*

Be it known that I, PETER VAN VLAANDEREN, a subject of the Queen of the Netherlands, residing at Bayonne, in the county of Hudson and State of New Jersey, have invented new and useful Improvements in Fenders, of which the following is a specification.

The general object of the invention is to refine the construction of automobile fenders in point of promoting the general efficiency of the same.

Another object is the provision of an automobile fender which may be actuated by an object contacting therewith, so as to grip and carry the object and prevent the same from passing under the wheels of the vehicle.

Other objects will appear and be better understood from that embodiment of my invention of which the following is a specification, reference being had to the accompanying drawings forming part hereof, in which:—

Figure 1 is a top plan view of a portion of an automobile frame showing my improved fender attached thereto. Fig. 2 is a detail side elevational view of the guard and one of the swinging arms applied with parts of the automobile frame broken away. Fig. 3 is a detail horizontal cross sectional view taken on the line 3—3 in Fig. 2. Fig. 4 is a detail plan view of the circuit breaker, forming part of my invention.

As shown in the drawings, 5 indicates the guard, 6 the swinging arms, 6′ the braking means actuated by the arms, and 6″ the circuit breaker actuated in conjunction with the break actuating means.

The guard 5 may be formed of any suitable metal, and is preferably shaped as shown in Fig. 2, whereby to be provided with the angularly-disposed attaching portion 9, which is bored so as to be bolted or otherwise secured to the frame of the vehicle *a*. The guard is positioned obliquely to the frame as shown, and has its lower end in spaced relation with the ground, so as to readily pick up an object in its path during the progressive movement of the vehicle.

The arm-carriers or brackets 7—7 are preferably formed so as to be provided with tubular body portions 10, having ends 11—11 bored so as to be bolted to the frame *a* of the vehicle. The front ends 12—12 of the arms are bifurcated as shown and thus provide suitable yoke-bearings for the support of the arms 6—6. These arms 6 may be of any desirable shape, but are preferably formed as shown in Fig. 2, of suitable metallic tubing or the like. At one portion of their vertical sides, the arms are provided with drums 13—13, which drums are located in the bifurcations of the arm carriers 7, as shown.

The drums are secured to the arms 6 by the screw bolts 14, which also secure to the drums the ends of the strap 8. This strap is preferably formed of leather or the like, and is so secured to the arms by means of the drums, that upon it assuming the position shown in dotted lines in Fig. 1, the arms will be swung inwardly to the dotted line position shown in the same figure. The drums, as shown in Fig. 3, are provided on a portion of their peripheries with the ratchets 15, which are engaged by the pawls 16. These pawls are actuated by the coil springs 17 and are adapted to slidingly reciprocate within the sleeves 18, housed within the tubular bodies 10 of the brackets. In order to manually release the pawls from engagement with the ratchets, the pawls are provided with the angularly disposed knobs or handles 19 which extend through the cylindrical members by means of the slots 20. These pawl and ratchet connections are provided so as to control the outward movement of the arms 6, for it will be seen that the pawl admits of the inward movement of the arms and prevents the outward; and in order to admit of the outward movement of the arms, the pawl must be drawn back and released from engagement with the ratchet.

In operation, the arms are normally extended as shown in full lines in Fig. 1. As the vehicle collides with an object in its path the object will obviously contact with the strap, and force the same backwardly, thus swinging the arms 6 inwardly, and by virtue of the pawl and ratchet connection above described, the outward movement of the arms is prevented, thus retaining the object between the arms and strap and within the guard. As the object is gripped by the device and carried along by the vehicle, it is manifestly desirable that the vehicle will be immediately stopped, and to effect the instantaneous stopping thereof, automatic means are provided which will be presently described.

Connected to each arm by suitable means are the cables 21—21 which are trained over suitable idlers 22 and are connected to a common sleeve 23; and to admit of the adjustment of the cables 21 turn-buckles 24 are provided thereon, as shown. The sleeve 23 is slidingly mounted on the actuating rod 25 of the brake-pedal 26, which operates the usual brake-system $b$. A collar 27 is secured to the rod 25; and positioned around the rod and between the collar and the sleeve, is a coil spring 28. It will be seen now that as the arms are swung inwardly, the rotation of the drums 13 will draw on the collars, thus progressing the sleeve along the rod, and by virtue of the spring being compressed against the collar 27, the brake rod 25 will effect the braking of the wheels, thus retarding the movement of the vehicle.

In order to fully stop the vehicle, when the brake is applied, a circuit-breaker $c$ is provided, and is adapted to operate simultaneously with the braking member and to interrupt the electric-circuit of the spark system in the motor. This circuit-breaker is composed of a spring-controlled swinging arm 29 which is provided with a pair of diametrically opposite contacts 30—30, which contacts form the connection between the terminals 31—31 on the circuit breaker $c$. The arm 29 is connected to one of the cables 21 by a flexible element 32, and is adapted to be swung around by means of the element 32 being pulled by the cables 21, upon the latter being actuated by arms 6 swinging to their inner position. Thus it will be seen, that as the arm 29 is rotated, the contacts 30—30 provided thereon, will be moved away from forming a contact between the terminals 31—31 of the circuit breaker, and obviously, the circuit being interrupted, the motor of the vehicle will stop for want of the essential ignition spark.

It is obvious that those skilled in the art may vary the details of construction and arrangements of parts without departing from the spirit of my invention and therefore I do not wish to be limited to such features except as may be required by the claim.

What is claimed as new is:

A fender comprising tubular brackets, arms pivotally mounted on the brackets, ratchets to the arms, spring means for normally holding the arms in open position, spring pressed pawls carried in the brackets and engageable with the ratchets, said pawls and ratchets operating when in engagement with each other to restrain the arms against outward swinging movement but adapted to permit the arms to swing inwardly, and means connecting the arms together and adapted when subjected to pressure to swing the arms from an open to a closed position.

In testimony whereof I affix my signature in presence of two witnesses.

PETER VAN VLAANDEREN.

Witnesses:
M. E. LAUGHLIN,
GEO. A. BYRNE.

Copies of this patent may be obtained for five cents each, by addressing the "Commissioner of Patents, Washington, D. C."